(12) United States Patent
Weber et al.

(10) Patent No.: US 11,147,370 B2
(45) Date of Patent: Oct. 19, 2021

(54) RACK

(71) Applicant: Peka-Metall AG, Mosen (CH)

(72) Inventors: Bernhard Weber, Beinwil am See (CH); Urs Eichenberger, Beinwil am See (CH); Franz Meyer, Hohenrain (CH)

(73) Assignee: PEKA-METALL AG, Mosen (CH)

( * ) Notice: Subject to any disclaimer, the term of this patent is extended or adjusted under 35 U.S.C. 154(b) by 85 days.

(21) Appl. No.: 16/609,876

(22) PCT Filed: May 15, 2018

(86) PCT No.: PCT/EP2018/062452
§ 371 (c)(1),
(2) Date: Oct. 31, 2019

(87) PCT Pub. No.: WO2018/210789
PCT Pub. Date: Nov. 22, 2018

(65) Prior Publication Data
US 2020/0054127 A1    Feb. 20, 2020

(30) Foreign Application Priority Data

May 15, 2017    (EP) .................................... 17171059

(51) Int. Cl.
*A47B 57/54*    (2006.01)
*F16B 2/14*    (2006.01)

(52) U.S. Cl.
CPC .............. *A47B 57/54* (2013.01); *F16B 2/14* (2013.01)

(58) Field of Classification Search
CPC ....... A47B 57/54; A47B 57/56; A47B 57/565; A47B 57/567; F16B 2/14
See application file for complete search history.

(56) References Cited

U.S. PATENT DOCUMENTS 1,554,137 A * 9/1925 Slifkin .................. A47B 57/52
108/6
2,937,766 A * 5/1960 Penn .................... A47B 57/562
211/193
(Continued)

FOREIGN PATENT DOCUMENTS

CN    205597617 U    9/2016
DE    19952403 A1    5/2001
(Continued)

OTHER PUBLICATIONS

International Search Report in PCT/EP2018/062452 dated Jun. 6, 2018, 7 pages.
(Continued)

*Primary Examiner* — Patrick D Hawn
(74) *Attorney, Agent, or Firm* — Pearne & Gordon LLP

(57) ABSTRACT

The invention relates to a rack comprising at least one longitudinal profile, which can be vertically aligned, to which retaining means can be attached, into which trays, cabinet elements or other shelf elements can be inserted, which retaining means are held in clamping fashion via clamping jaws on the longitudinal profile. The clamping jaws are attached to a first plate-shaped based body and to a second plate-shaped base body, which are arranged lying one atop the other and can be moved against each other, guided by guiding means, and as a result the clamping jaws can be tensioned against lateral surfaces of the longitudinal profile. A rotation axle of an eccentric for moving the clamping jaws is rotatably mounted in the first plate-shaped base body and the eccentric body protrudes into a recess of the second plate-shaped base body. A simply designed retaining means is thus obtained which can be easily clamped on the longitudinal profile.

13 Claims, 9 Drawing Sheets

(56) References Cited

U.S. PATENT DOCUMENTS

| | | | | |
|---|---|---|---|---|
| 5,934,636 | A | * | 8/1999 | Cyrell .................. F16M 11/046 |
| | | | | 248/246 |
| 6,527,473 | B2 | * | 3/2003 | Chen .................. A47B 87/0207 |
| | | | | 211/182 |
| 8,225,946 | B2 | * | 7/2012 | Yang ...................... A47K 17/00 |
| | | | | 211/90.02 |
| 9,883,742 | B2 | * | 2/2018 | Yang ...................... A47K 3/281 |
| 10,064,523 | B2 | * | 9/2018 | Engell ........................ A47F 5/01 |
| 10,758,091 | B2 | * | 9/2020 | Engell ........................ A47K 5/04 |
| 2009/0236485 | A1 | * | 9/2009 | Goepfert ................. F16B 12/50 |
| | | | | 248/295.11 |
| 2014/0252187 | A1 | | 9/2014 | Petrovic |

FOREIGN PATENT DOCUMENTS

| | | | |
|---|---|---|---|
| EP | 3090653 | A1 | 11/2016 |
| GB | 1311960 | A | 3/1973 |

OTHER PUBLICATIONS

Written Opinion in PCT/EP2018/062452 dated Jun. 6, 2018, 5 pages.

\* cited by examiner

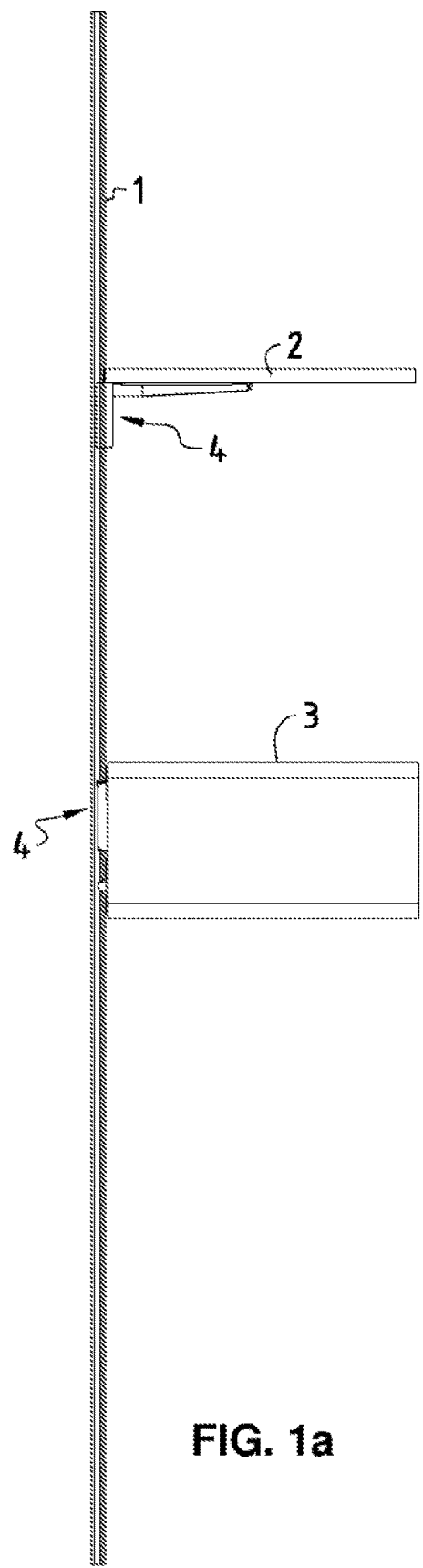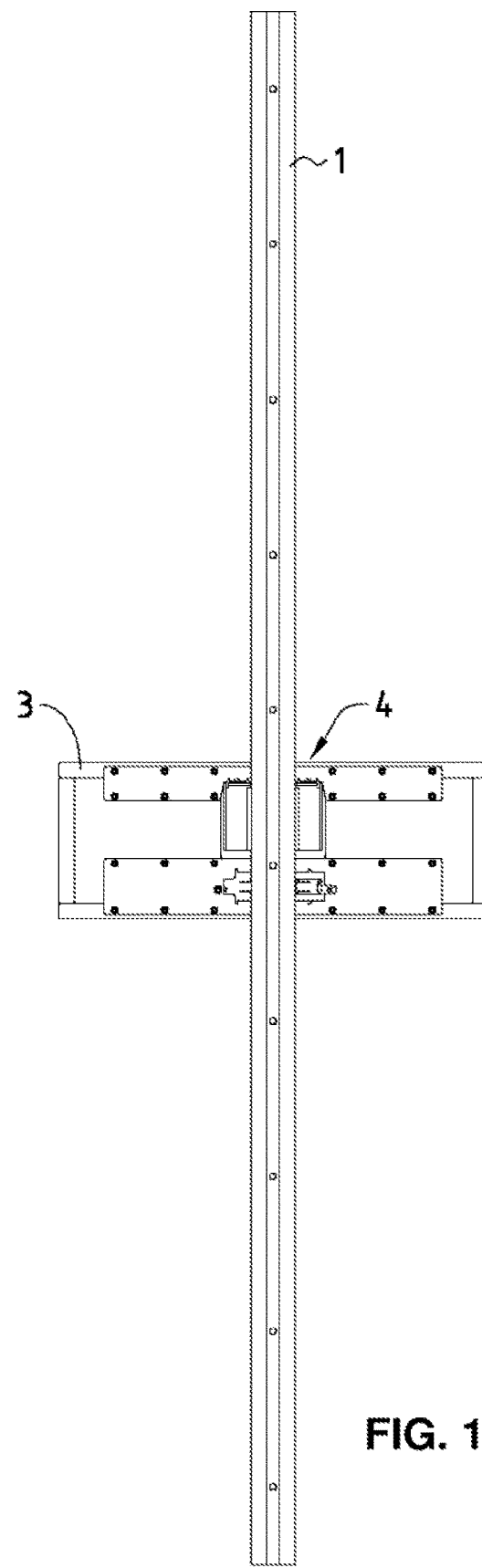
FIG. 1a
FIG. 1b

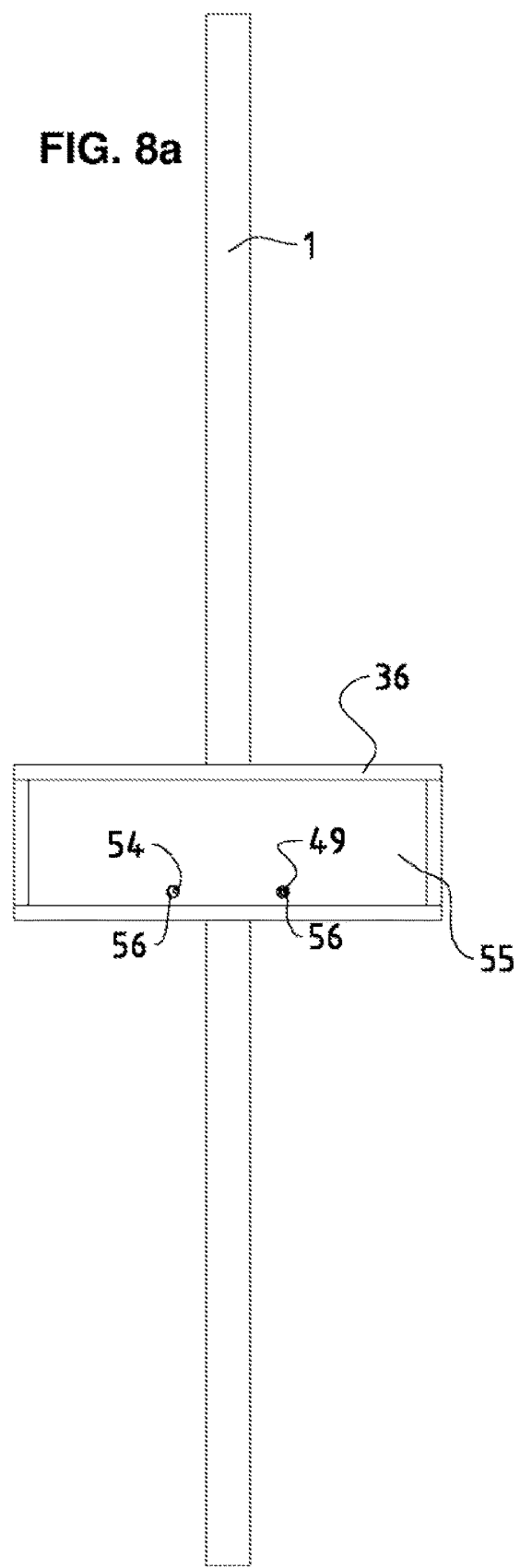
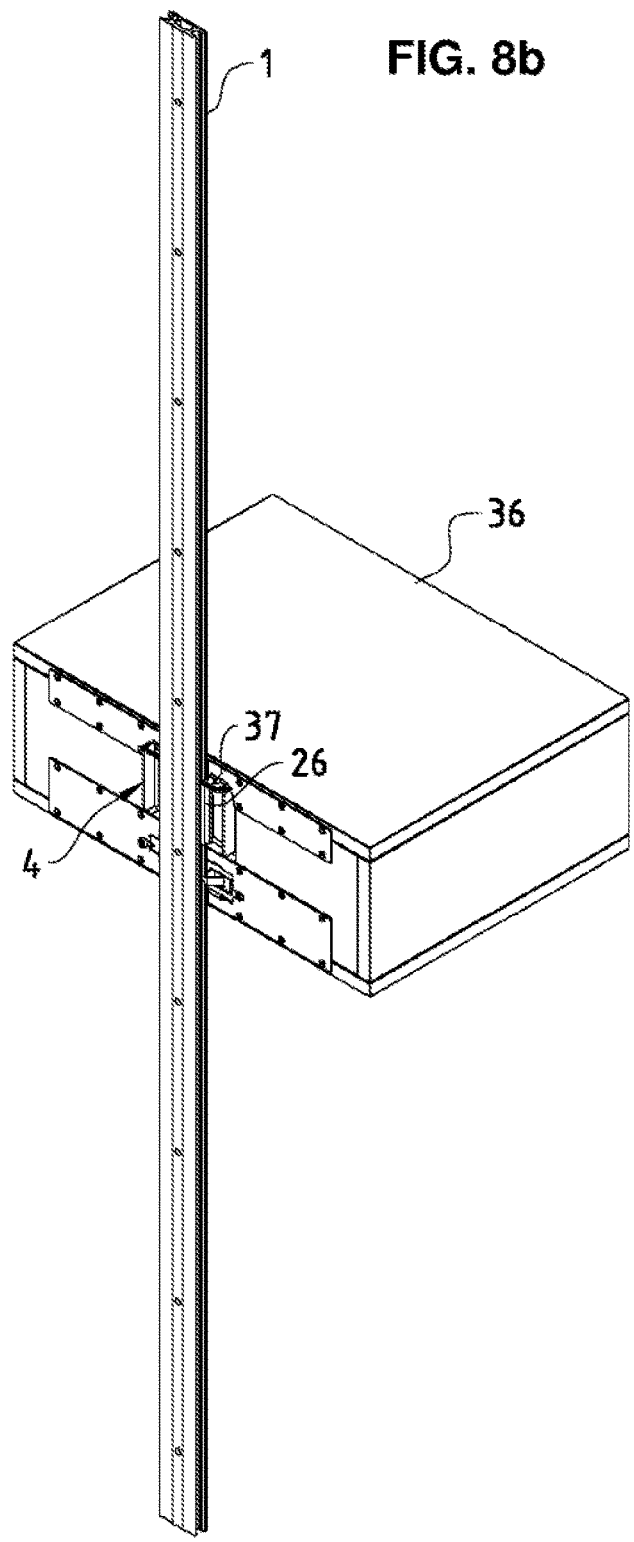
FIG. 8a
FIG. 8b

RACK

The present invention relates to a shelf, comprising at least one vertically alignable longitudinal section, holding means attachable on the longitudinal section in any desired position and provided with clamping means, and, attachable on the holding means, bearing structures which are designed to bear shelf boards, cabinet elements or other shelf elements, which clamping means have clamping jaws, which are able to be tensioned with respect to one another via tensioning means, and the clamping jaws are pressable against clamping surfaces of the longitudinal section.

Shelves of this kind are known in diverse ways. Holding elements are held in a clamped way on longitudinal sections, which can be attached to a wall, for example, or are set up as room dividers in a free-standing way. Placed on these holding elements can be shelf boards, for example. The clamping action of these holding elements on the longitudinal sections has the advantage that these holding elements are able to be fixed in the longitudinal section in any desired position; the position is not predetermined, for example by means of a grid system in which the holding elements have to engage.

Often used as clamping means are clamping tabs or lugs, which are positioned around a corresponding part of the longitudinal section and are tensioned by means of screws. This design of the clamping means has the result that the clamping means need to be tensioned in an involved way. In many cases clamping means of this kind also do not fulfil the requirements in aesthetic respect.

The object of the present invention thus consists in creating a shelf in which the clamping means are constructed in a simple way, with which a great clamping force and thereby a secure holding of the shelf boards, cabinet elements or other shelf elements is able to be achieved, and which are simple to operate or handle.

This object is achieved according to the invention in that the clamping means are composed of a first plate-shaped basic body and a second plate-shaped basic body, on whose sides remote from one another the clamping jaws are installed, which plate-shaped basic bodies are disposed lying on top of one another and are displaceable toward one another in a guided way via guide means, and the clamping jaws are thereby able to be tensioned against lateral surfaces of the longitudinal section, and in that borne in a rotatable way in the first plate-shaped basic body is a rotational shaft or axis of an eccentric, and the eccentric body projects into a recess of the second plate-shaped basic body.

By means of this design according to the invention, the holding means are able to be placed in a simple way and in any position on the longitudinal section; through simple rotation of the eccentric, the two plate-shaped basic bodies, provided with clamping jaws, are displaced toward one another, whereby the clamping jaws are tensioned against the lateral surfaces of the longitudinal section. Via the eccentric, powerful clamping forces are able to be generated, whereby a secure holding of the holding means on the longitudinal section is ensured.

Preferably, the clamping jaws are formed by bends of the lateral regions remote from one another of the first plate-shaped basic body and of the second plate-shaped basic body. In particular when these plate-shaped basic bodies are made of metal, these bends can be achieved in an easy way by an edge bending step, which greatly simplifies the production.

Preferably, the longitudinal section has a base area, a surface area opposite the base area, and one first wedge surface each, worked into the lateral surfaces, and the clamping jaws are each provided with a second wedge surface corresponding to the first wedge surface. During tensioning of the clamping jaws, powerful clamping forces can thereby be achieved without great effort to tension the tensioning means; the holding means are thus fixed in the longitudinal section in a secure way. By putting the wedge surfaces on the lateral surfaces of the longitudinal section, the visible surface of the longitudinal section can be smoothly designed, which leads to an optically attractive aesthetic effect.

Preferably, the longitudinal section is provided, in the surface area, with a longitudinally running, groove-shaped recess, which is able to be covered by a cover section. This recess can be used, for example, as cable channel which can be hidden by the cover section.

Another preferred embodiment of the invention consists in that the guide means are composed of a pin, which is fixed in the first plate-shaped basic body, and which projects by a protruding region through a slot-shaped recess, which is provided in the second plate-shaped basic body, and is provided with a head. A solution of this kind can be produced very easily and economically.

Preferably fixed to the first plate-shaped basic body is an adapter, to which are attachable the bearing structures for bearing shelf boards, cabinet elements or other shelf elements.

Preferably the adapter is a supporting plate, which is provided with screw holes, whereby the fixing of the most diverse bearing structures on the adapter can take place in a simple way.

Preferably, insertable on the surface area of the first plate-shaped basic body turned toward the support section is a protective plate, whereby the surface of the support section or respectively of the cover section is protected against scratches by the holding means.

Preferably, cover elements are placeable on the holding means and/or the adapter, whereby the aesthetic requirements are optimally fulfilled.

In particular when a cabinet element is being attached with a holding means to a longitudinal section, it can be necessary for this cabinet element, in particular if it has a great length, to have a lateral inclination. In order to bring the cabinet element into the horizontal position, it is advantageous if alignment means are provided on the cabinet element, which alignment means support themselves on the longitudinal section, and with which the cabinet element is able to be aligned in the horizontal position.

Preferably this alignment means consists of a base plate, which is fixable on the cabinet element, which base plate is provided with guide means, in which two clamping plates, provided with clamping jaws, are held in a displaceable way, which clamping plates, after the clamping on the longitudinal section, are slidable and fixable. The cabinet element can thus be fixed in the desired position on the longitudinal section via the holding means. The clamping plates of the alignment means can also be clamped on the longitudinal section. The clamped clamping jaws then allow themselves to be displaced in the base plate, together with the cabinet element, until the horizontal position of the cabinet element is reached. The clamped clamping plates can then be fixed with respect to the base plate. A very easy alignment of the corresponding cabinet element is thereby ensured.

Preferably the clamping of the two clamping plates of this alignment means takes place via an eccentric, whereby the clamping step can be carried out very easily.

Embodiments of the invention will be explained more closely in the following, by way of example, with reference to the attached drawings.

FIG. 1a shows a lateral view of a shelf with longitudinal section and shelf board and cupboard element inserted therein;

FIG. 1b shows a view from behind of the longitudinal section with inserted cabinet element;

Figure 9:
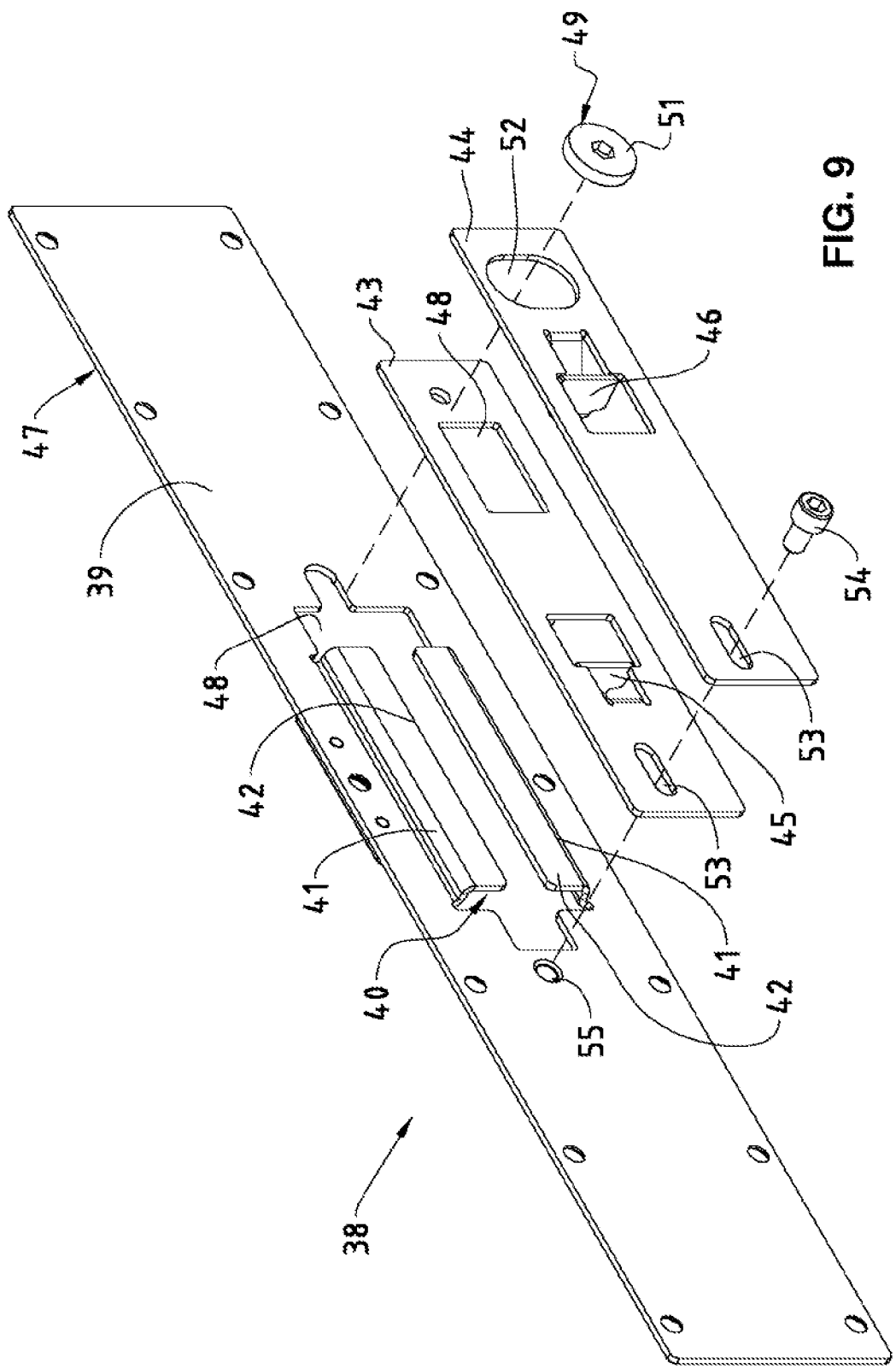
Figure 10:
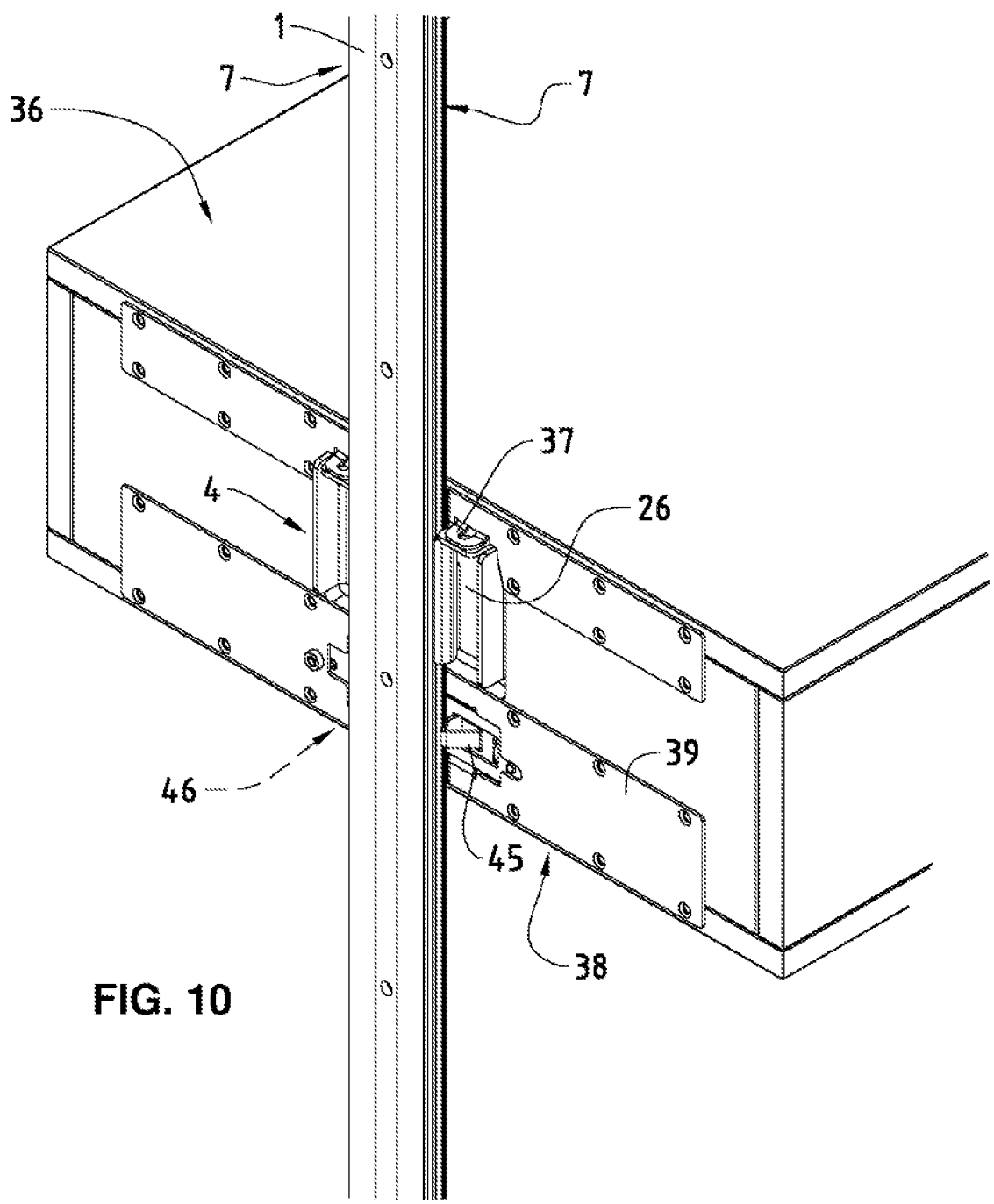

FIGS. 8a and 8b each show a view of a cabinet element which is held in the longitudinal section via holding means;

FIG. 9 shows in a spatial representation the alignment means which can be fixed to a cabinet element, in pulled-apart state; and FIG. 10 shows in a spatial and enlarged representation a view from behind of the cabinet element with holding means and alignment means.

Visible in FIGS. 1a and 1b is in each case a longitudinal section 1, in which (as will still be described subsequently) holding means 4 can be inserted which serve the purpose of holding shelf boards 2 and cabinet elements 3 and the like on the longitudinal section 1. Longitudinal sections 1 of this kind can be attached on walls, for example, but they can also be used as room dividers, for instance, whereby the strength or thickness of the longitudinal section would have to be increased, however. A plurality of longitudinal sections 1 can thereby be attached on the wall next to one another, in which the shelf boards 2 or further cabinet elements 3 or other shelf elements, which can have different functions, can be inserted. Shelves can thereby be set up in any form which are able to fulfil the desired requirements. Usually the shelf boards 2 or the cabinet elements 3 are each held in a single longitudinal section 1.

Figure 2:
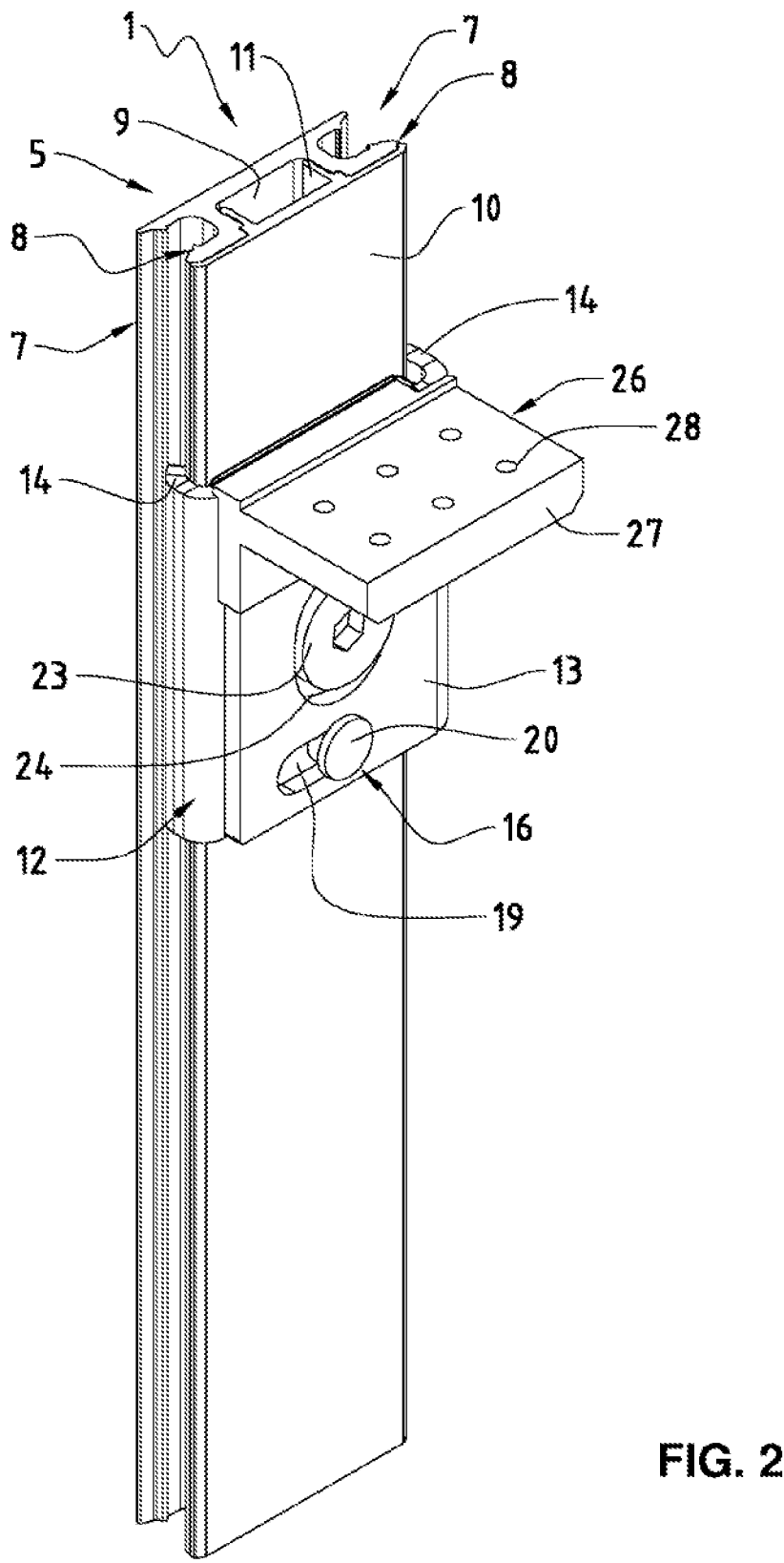
FIG. 2 is a spatial representation of a section of a longitudinal section with inserted holding means.
Figure 3:
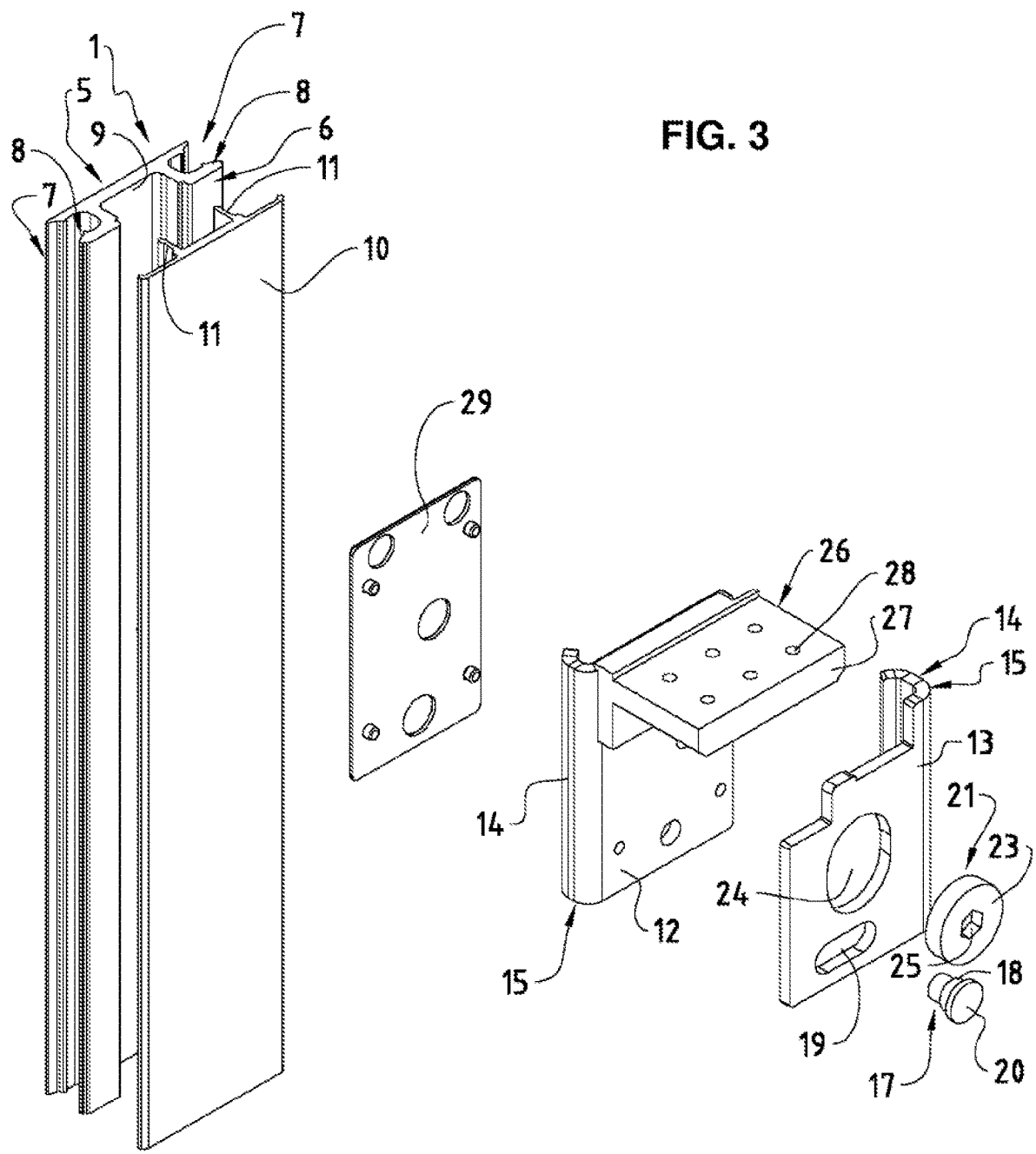
FIG. 3 shows in a spatial representation a section of a longitudinal section with the holding means according to FIG. 2 in pulled-apart state.

Visible in FIGS. 2 and 3 is part of a longitudinal section 1. This longitudinal section 1, which can be made of a suitable metal, in particular aluminium, has a flat base area 5 and a surface 6, opposite the base area 5, as well as two lateral surfaces 7. Worked into each of the two lateral surfaces 7 is a first wedge surface 8. Worked into the surface 6 of the longitudinal section 1 is a longitudinally running groove-shaped recess 9. In a known way (not shown), for example, cable can be run in this groove-shaped recess 9 running along the longitudinal section 1. Also able to serve as cable ducts are the grooves arising in the lateral surfaces 7 through the making of the first wedge surfaces 8. In the bottom of this recess 9 continuous bores can be made, in a known way; the longitudinal section 1 can be fixed by means of screws to a wall or the like in vertical alignment.

The recess 9 of the longitudinal section 1 can be covered with a cover section 10. This cover section 10 covers over the entire surface 6 of the longitudinal section 1. Moreover this cover section 10 is provided with retaining webs 9, via which this cover section 10 can be in engaged in the recess 9.

The holding means 4 are formed by a first plate-shaped basic body 12 and a second plate-shaped basic body 13. Clamping jaws 14 are fixed on each of these plate-shaped basic bodies 12 and 13 on their sides remote from one another. The first basic body 12 and the second basic body 13 are preferably made of a metal; the clamping jaws 14 can thereby be obtained in an easy way by means of bends 15 of the lateral regions remote from one another. The first plate-shaped basic body 12 and the second plate-shaped basic body 13 are disposed lying on top of one another and in a way displaceable toward one another. This displaceability is guided via guide means 16. These guide means 16 in the embodiment example shown here consist of a pin 17, which is fixed in the first plate-shaped basic body 12 and projects by a protruding region 18 through a slot-shaped recess 19, which is provided in the second plate-shaped basic body 13, and is provided with a head 20. Via these guide means 16, the first plate-shaped basic body 12 and the second plate-shaped basic body 13 can be displaced transversely to one another.

The displacement of the first basic body 12 and of the second basic body 13 takes place via an eccentric 21, whose rotational axis or shaft 22 (FIG. 5) is borne in a rotatable way in the first plate-shaped basic body 2, while the eccentric body 23 projects into a recess 24 of the second plate-shaped basic body 13. Provided in the eccentric body 23 is a tool holding device 25, which, in the embodiment example shown here, is designed as a hexagonal opening. A suitable tool can be inserted into this tool holding device 25; the eccentric 21 can thereby be rotated in a simple way, whereby the two plate-shaped basic bodies 12 and 13 can be moved toward each other.

Fixed on the first plate-shaped basic body 12 is an adapter 26, on which (as will still be described later) bearing structures for bearing shelf boards, cabinet elements or other shelf elements can be attached. In the embodiment example shown here, this adapter 26 consists of a supporting plate 27, which is provided with screw holes 28.

Insertable on the surface of the first plate-shaped basic body 12 turned toward the longitudinal section 1 is a protective plate 29, which is made, for example, of a plastic, whereby the surface of the longitudinal section 1 or respectively the surface of the cover section 10 is protected against scratches from the first plate-shaped basic body 12.

Figure 4:
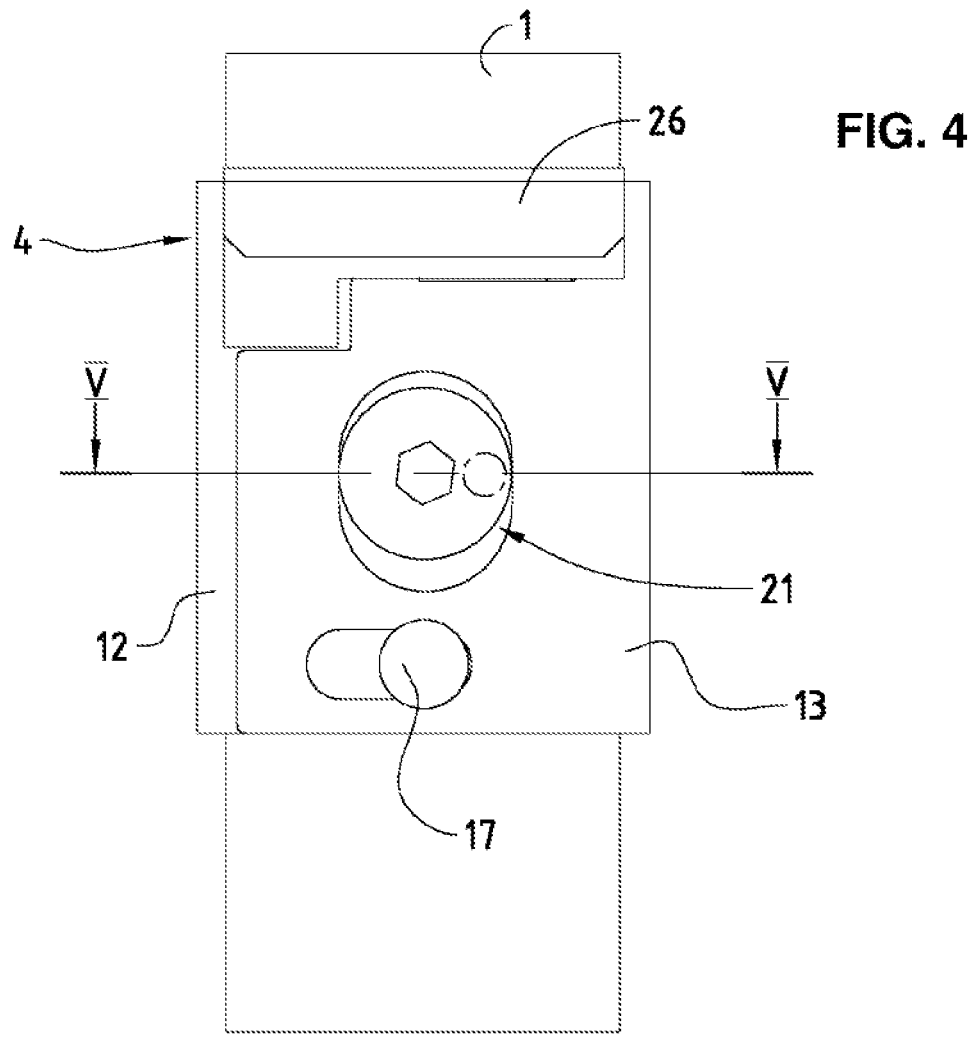
FIG. 4 is a view from the front of the holding means inserted in the longitudinal section.
Figure 5:
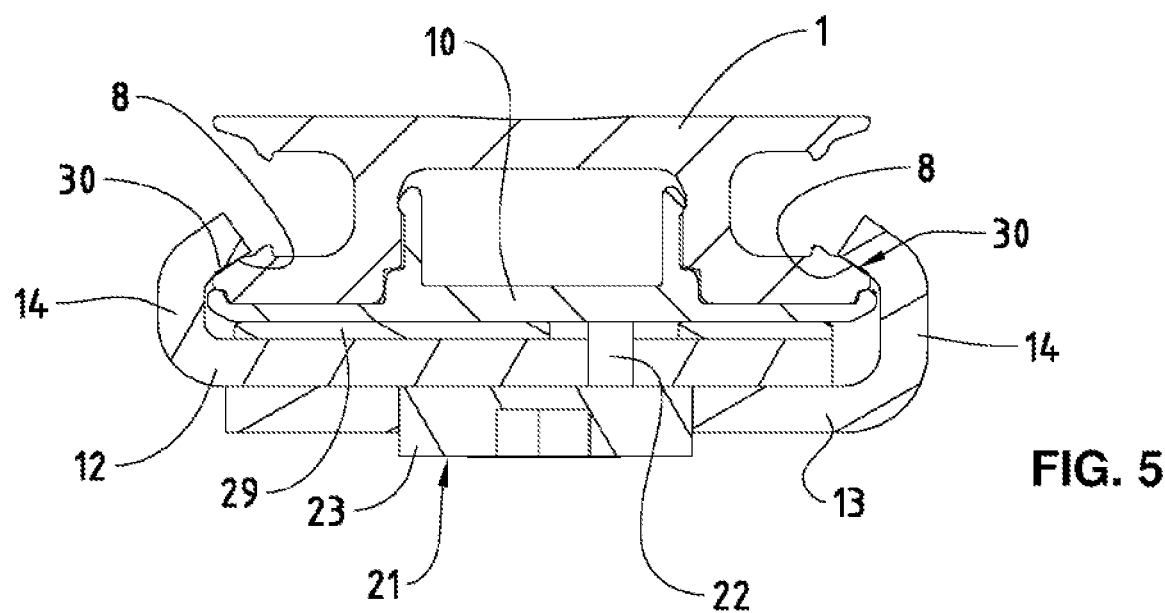
FIG. 5 is a sectional representation along the line V-V through the holding means according to FIG. 4.

Seen in FIGS. 4 and 5 is the holding means 4, which is placed and tensioned on the longitudinal section 1. To place the holding means 4 on the longitudinal section 1, the eccentric 21 is rotated in such a way that the first basic body 12 and the second basic body 13 are located in the moved-apart position. The holding means 4 can then be placed on the longitudinal section 1 from the front and brought into the correct position. Afterwards the eccentric 21 is rotated in such a way that the first basic body 12 and the second basic body 13 move toward each other. The clamping jaws 14 of the first basic body 12 and of the second basic body 13 end up with their second wedge surfaces 30 on the first wedge surfaces 8 of the longitudinal section 1. Through the inclination of these wedge surfaces 8 and 30, which have a wedge angle of about 20 degrees to 30 degrees, an optimal clamping takes place; the holding means 4 is moreover pressed against the surface of the longitudinal section 1. Through this tensioning of the two clamping jaws 14, the holding means 4 in are held in an optimal way on the longitudinal section 1. In this state the corresponding shelf boards, cabinet elements or other shelf elements can be put on the adapter 26 of the holding means 4.

Figure 6A:
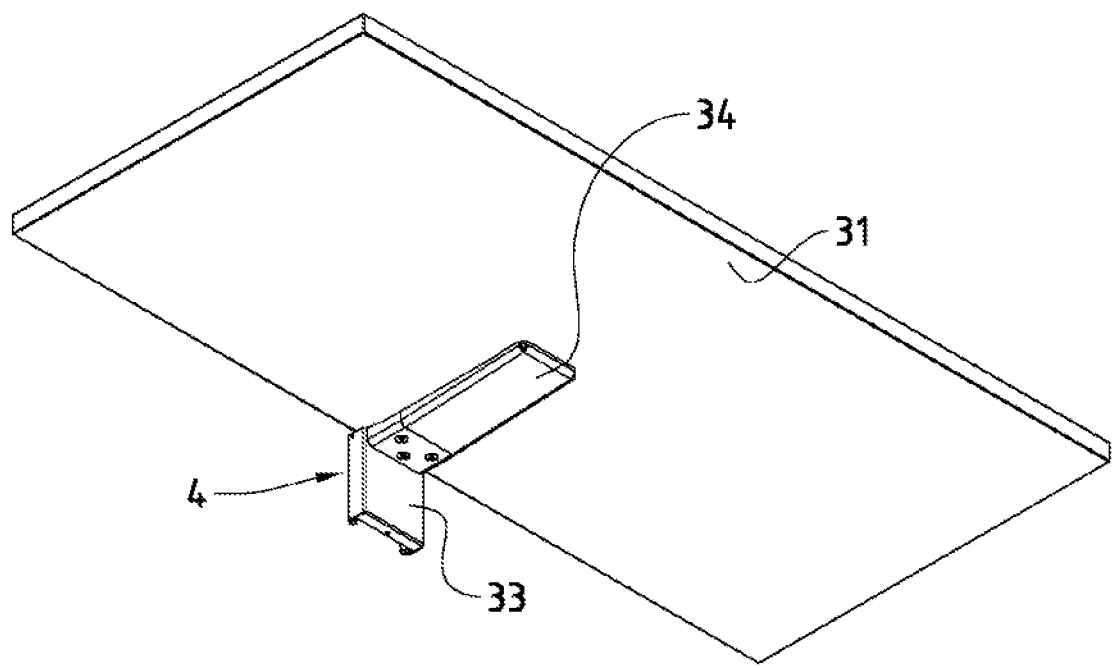
FIG. 6a shows in a spatial representation a shelf board placed on the holding means with covered adapter.
Figure 6B:
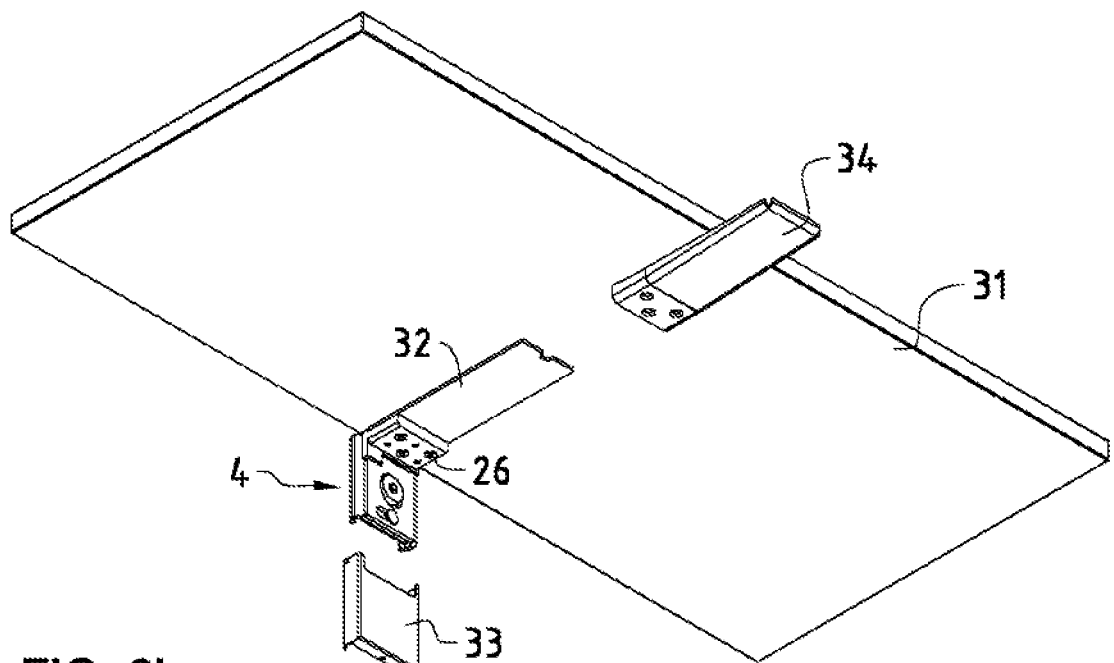
FIG. 6b shows in a spatial representation the shelf board placed on the holding means according to FIG. 6, whereby the covers are removed.

Seen from FIGS. 6a and 6b is how a shelf board 31 can be placed on the holding means 4 or respectively its adapter 26. This shelf board 31 is provided with a reinforcement plate 32 attached to it. By means of this reinforcement plate 32, the shelf board 31 is screwed on the adapter 26 of the holding means. A first cover element 33 can be put on the holding means 4. A second cover element 34 can be put on the reinforcement plate 32 and the adapter 26. These two cover elements 33 and 34 can be made of plastic, for example.

Figure 7:
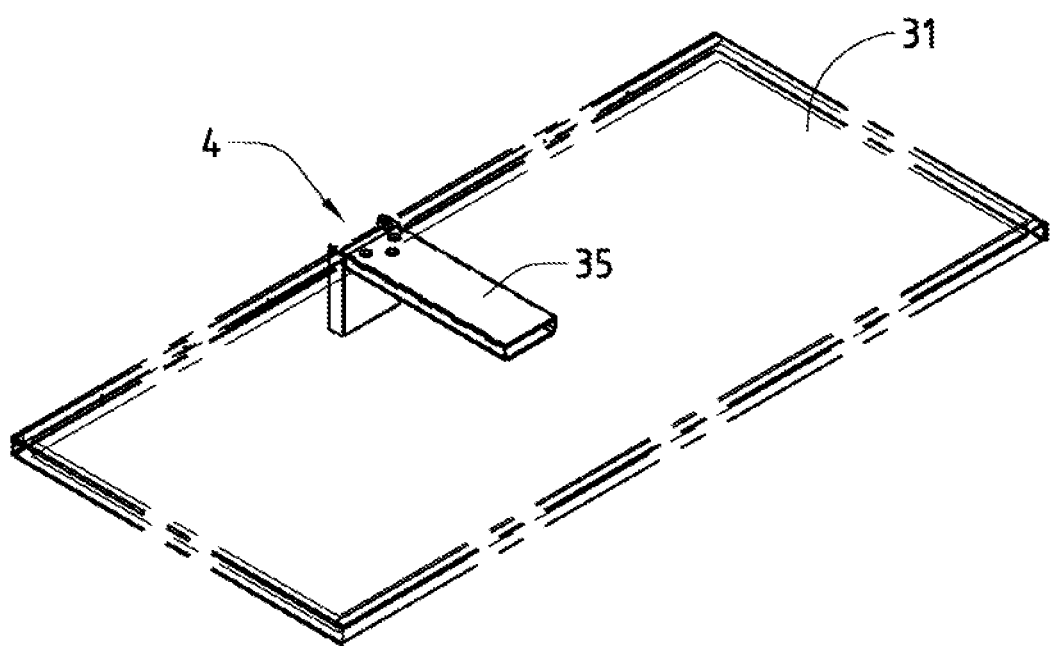
FIG. 7 shows in a spatial representation another type of shelf board which is placed on the holding means.

FIG. 7 likewise shows a shelf board 31, which is made of sheet metal, for example. Inserted into the inner hollow space of this shelf board 31 can be a tubular element 35, which can be slipped onto the adapter of the holding means 4 and fixed by means of screws.

In FIGS. 8a and 8b a longitudinal section 1 can be seen again, in which a cabinet element 36 is inserted via the holding means 4. The adapter 26 of this holding means 4 is designed in such a way that the cabinet element 36 can be hooked or suspended via known hooking means 37 in the adapter 26 and can thereby be held in the holding means 4. Provided on the cabinet element 36 are alignment means 38 below the hooking means 37 and thus below the holding means 4. Via these alignment means 38 the cabinet element 36 can be aligned with respect to the longitudinal section 1, so that lateral inclinations of the cabinet element 36 can be compensated, as will still be described in the following.

As can be seen from FIG. 9, these alignment means 38 consist of a base plate 39, which is provided with guide means 40. These guide means 40 are formed by two bends 41, which are made in the base plate 39, and by means of which guide rails 42 are formed. Pushed into these guide rails 42 are two superimposed clamping plates 43 and 44, which are thereby held in a way slidable toward one another and with respect to the base plate 39. The clamping plate 43 lying below is provided with a clamping jaw 45, which is disposed on the left side in the clamping plate 43 shown here. The clamping plate 44 lying above is likewise provided with a clamping jaw 46, which, in this figure, is put on the right side of the clamping plate 44. These two clamping jaws 45 and 46 project beyond the surface 47 of the base plate 39 in the assembled state of these alignment means 38, which is why recesses 48 are made in each of the respective plates.

The mutual displacement of the two clamping plates 43 and 44 takes place via an eccentric 49, which is held in a rotatable way in a bore 50 in the clamping plate 43, while the eccentric body 51 comes to lie in a recess 52 of the clamping plate 44. Through rotation of this eccentric 49, the clamping plates 43 and 44 can be displaced toward one another. The clamping jaws 45 and 46 can thus be moved toward one another and away from one another.

The two clamping plates 43 and 44 each have a slot-shaped recess 53, through which a screw 54 is led, which is screwable into a bore 55, provided with a threading, in the base plate 39. By tightening this screw 54, the two clamping plates 43 and 44 are fixed in the base plate 39.

As can be seen from FIG. 10, the alignment means 38 are attached on the rear side of the cabinet element 36. To install this cabinet element 36 on the longitudinal section 1, the cabinet element 36 with the hooking means 37 are inserted on the adapter 26 of the holding means 4, which are fixed on the longitudinal section 1. For this purpose, the clamping jaws 45 and 46 are located in the position moved apart from each other. In hooked-in state of the cabinet element 36, the two clamping plates 45 and 46 are thus located on both sides of the lateral surfaces 7 of the longitudinal section 1. Through rotation of the eccentric 49, the two clamping jaws 45 and 46 can be pushed against the lateral surfaces 7 of the longitudinal section 1 and brought into the clamping position. The screw 54 is in the released position. The cabinet element 36 can thus be adjusted in inclination with respect to the longitudinal section 1, while the clamping jaws 45 and 46 are located in the clamping position with the longitudinal section 1. When the desired, in particular horizontal, position of the cabinet element 36 is reached, the screw 54 can be tightened; the two clamping plates 43 and 44 and thus the clamping jaws 45 and 46 are fixed with respect to the base plate 39 and thus with respect to the cabinet element 36, and the cabinet element 36 is located in the fixed, aligned position.

To facilitate access for manipulation of the eccentric 49 and of the screw 54, two bores 56 are made, as can be seen from FIG. 8a, respectively in the rear wall 55 of the cabinet element 36 in the region of the eccentric 51 and of the screw 54, through which bores the eccentric 51 or respectively the screws are rotatable via a suitable tool in each case.

The alignment means 38 installable on the cabinet element 36 have been described in the previously described embodiment profile in the context of a longitudinal section 1, which is equipped in a corresponding way for the shown holding means 4, but these alignment means 38 can of course be used for any other longitudinal sections having lateral surfaces suitable for clamping and with which other embodiment types of holding means can be employed, in a way coordinated with the longitudinal section. The holding means can be clamped, screwed, hooked or connected in any other way to the longitudinal section.

With this solution according to the invention, a shelf is obtained which is very simple in construction, with which the holding means are able to be installed on the longitudinal section in the simplest way and with optimal fixation. The holding means are designed in such a way that practically any desired shelf boards, cabinet elements or other shelf elements can be used, whereby the insertion of these elements can take place in a very simple manner.

What is claimed is:

1. Shelf, comprising at least one vertically alignable longitudinal section;
   a holding device attachable on the longitudinal section in any desired position; and
   bearing structures which are designed to bear shelf boards, cabinet elements or other shelf accessory items;
   wherein the holding device comprises a first plate-shaped basic body and a second plate-shaped basic body, on whose sides remote from one another clamping jaws are installed,
   wherein the clamping jaws are able to be tensioned with respect to one another via a tensioning member, and the clamping jaws are pressable against clamping surfaces of the longitudinal section,
   wherein the plate-shaped basic bodies are disposed lying on top of one another and are displaceable in a guided way via a guide member, and the clamping jaws are thereby able to be tensioned against lateral surfaces of the longitudinal section, and wherein borne in a rotatable way in the first plate-shaped basic body is a rotational shaft or axis of a first eccentric having an eccentric body that projects into a recess of the second plate-shaped basic body.

2. Shelf according to claim 1, wherein the clamping jaws are formed by bends of lateral regions remote from one another of the first plate-shaped basic body and of the second plate-shaped basic body.

3. Shelf according to claim 1, wherein the longitudinal section has a base area, a surface area opposite the base area, and opposing first wedge surfaces at lateral surfaces of the longitudinal section, and wherein the clamping jaws are each provided with a second wedge surface corresponding to an associated one of said first wedge surfaces.

4. Shelf according to claim 3, wherein the longitudinal section is provided, in the surface area, with a longitudinally running, groove-shaped recess adapted to be covered by a cover section.

5. Shelf according to claim 1, wherein the guide member comprises a pin fixed in the first plate-shaped basic body and having a protruding region that projects through a slot-shaped recess in the second plate-shaped basic body.

6. Shelf according to claim 1, wherein fixed to the first plate-shaped basic body is an adapter, to which are attachable the bearing structures for bearing shelf boards, cabinet elements or other shelf accessory items.

7. Shelf according to claim 6, wherein the adapter has a supporting plate with screw holes.

8. Shelf according to claim 1, wherein insertable on a surface area of the first plate-shaped basic body turned toward the longitudinal section is a protective plate.

9. Shelf according to claim 6, wherein cover elements are placeable on the holding device and/or the adapter.

10. Shelf in particular according to claim 1, wherein a cabinet element insertable in the longitudinal section is held in the longitudinal section by said holding device and wherein installed on the cabinet element is an alignment member.

11. Shelf according to claim 10, wherein the alignment member comprises a base plate fixable on the cabinet element and comprising guide rails, in which two clamping plates, provided with clamping jaws, are held in a displaceable way, which clamping plates, after the clamping on the longitudinal section, are slidable and fixable.

12. Shelf according to claim 11, wherein the clamping takes place via a second eccentric.

13. Shelf according to claim 1, wherein the first plate-shaped basic body and the second plate-shaped basic body each comprises one of said clamping jaws.

\* \* \* \* \*